(12) United States Patent
Reich et al.

(10) Patent No.: US 11,644,101 B2
(45) Date of Patent: May 9, 2023

(54) SEAL INFLATION/DEFLATION APPARATUS AND METHOD OF USE THEREOF

(71) Applicants: Alton Reich, Huntsville, AL (US); James Shaw, Sterling, CT (US)

(72) Inventors: Alton Reich, Huntsville, AL (US); James Shaw, Sterling, CT (US)

(*) Notice: Subject to any disclaimer, the term of this patent is extended or adjusted under 35 U.S.C. 154(b) by 405 days.

(21) Appl. No.: 16/892,727

(22) Filed: Jun. 4, 2020

(65) Prior Publication Data

US 2021/0381604 A1 Dec. 9, 2021

(51) Int. Cl.
| | |
|---|---|
| *B01D 53/02* | (2006.01) |
| *F16J 15/46* | (2006.01) |
| *B01D 53/04* | (2006.01) |
| *F04B 7/00* | (2006.01) |

(52) U.S. Cl.
CPC .......... *F16J 15/46* (2013.01); *B01D 53/0415* (2013.01); *B01D 53/0454* (2013.01); *F04B 7/00* (2013.01); *B01D 2253/108* (2013.01)

(58) Field of Classification Search
CPC .......... B01D 2253/108; B01D 53/0415; B01D 53/0454; F04B 7/00; F16J 15/46
See application file for complete search history.

(56) References Cited

U.S. PATENT DOCUMENTS

| | | | | |
|---|---|---|---|---|
| 9,719,521 B2* | 8/2017 | Sears | ................ | F16J 15/00 |
| 2004/0050043 A1* | 3/2004 | Johansson | ............ | F02G 1/043 |
| | | | | 60/517 |
| 2006/0048510 A1* | 3/2006 | White | ............... | F02G 1/0435 |
| | | | | 60/520 |
| 2019/0186306 A1* | 6/2019 | Göransson | ............ | F15B 1/24 |
| 2019/0292023 A1* | 9/2019 | Martinsen | ............ | B63B 27/10 |
| 2020/0121341 A1* | 4/2020 | Ogata | .................. | A61B 34/30 |
| 2021/0370373 A1* | 12/2021 | Yamamoto | ............ | B21C 27/00 |

* cited by examiner

*Primary Examiner* — Christopher P Jones
(74) *Attorney, Agent, or Firm* — Kevin H. Hazen; Hazen Patent Group, LLC

(57) ABSTRACT

The invention comprises a method and apparatus for: (1) alternatingly in time inflating and deflating a sealed compartment that includes: a first flexible and deformable seal connected to a pressure control chamber; (2) alternatingly in time pumping a gas into a first chamber and a second chamber separated by a first piston in a first partially sealed cylinder of a double acting kinematic cylinder, the double acting kinematic cylinder further comprising a second partially sealed cylinder, including: a second piston and the pressure control chamber, the pressure control chamber both on a first side of the second piston and within the second partially sealed cylinder; and (3) transferring a force from the first piston to the second piston via a rigid coupler affixed at a first end to the first piston and at a second end to the second piston, such as to alternating inflate and deflate a seal.

10 Claims, 6 Drawing Sheets

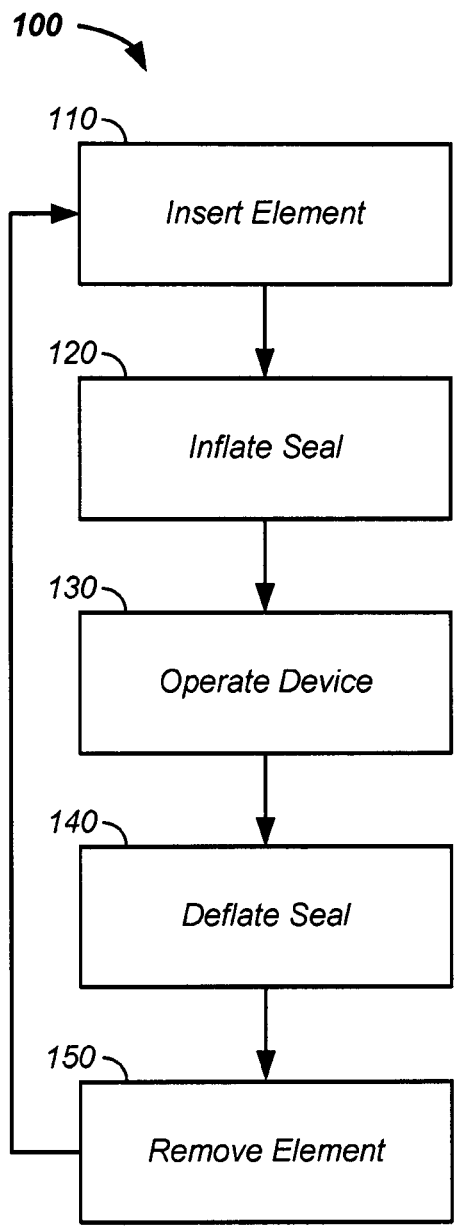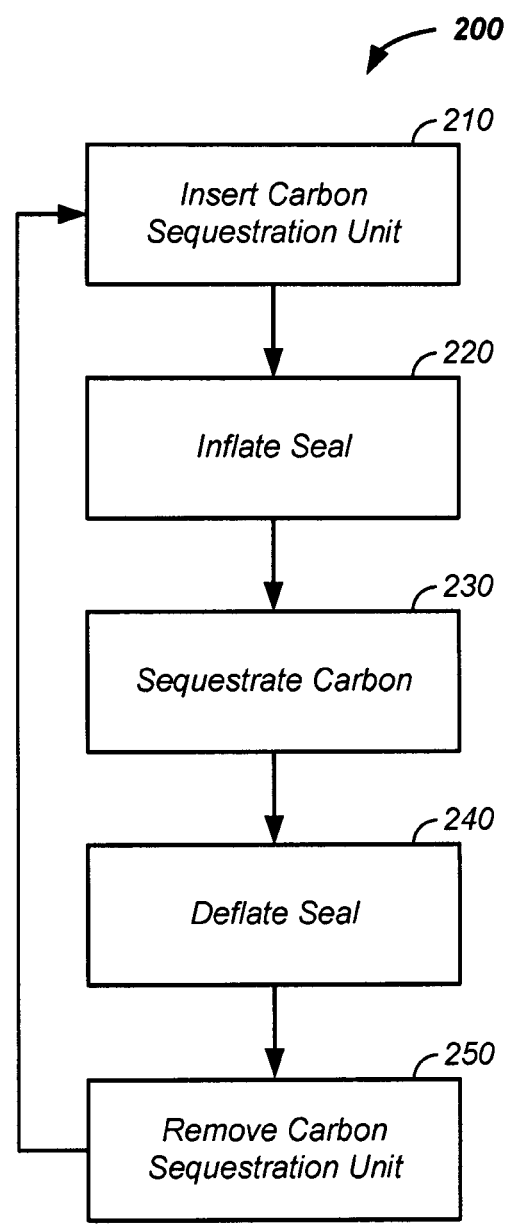
FIG. 1                    FIG. 2

US 11,644,101 B2

SEAL INFLATION/DEFLATION APPARATUS AND METHOD OF USE THEREOF

BACKGROUND OF THE INVENTION

Field of the Invention

The present invention relates generally to a pump system, for repetitive inflation/deflation of a seal, apparatus and method of use thereof.

Discussion of the Related Art

While a wide variety of seals are used, the problem remains breaking a flexible seal to allow removal of an object and insertion of a new object without damage to the flexible seal.

SUMMARY OF THE INVENTION

The invention comprises two coupled pumps connected to a deformable seal.

DESCRIPTION OF THE FIGURES

FIG. 1 provides a block diagram of an inflation/deflation seal system;

FIG. 2 provides a block diagram of the inflation/deflation seal system as part of a carbon sequestration unit;

DETAILED DESCRIPTION OF THE INVENTION

Figure 3:
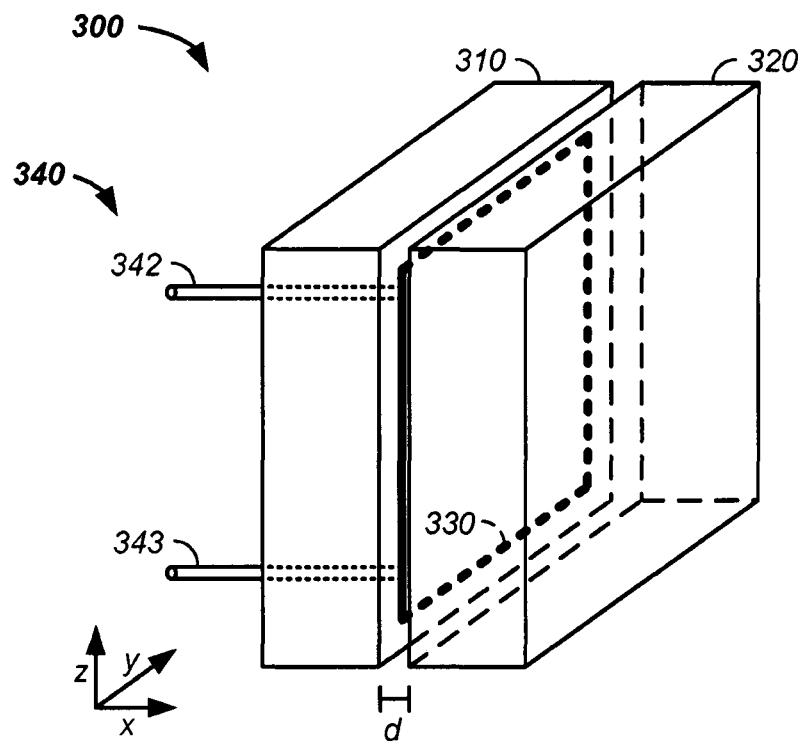
FIG. 3 illustrates a single deformable seal system.

The invention comprises a method and apparatus for: (1) alternatingly in time inflating and deflating a sealed compartment that includes: a first flexible and deformable seal connected to a pressure control chamber; (2) alternatingly in time pumping a gas into a first chamber and a second chamber separated by a first piston in a first partially sealed cylinder of a double acting kinematic cylinder, the double acting kinematic cylinder further comprising a second partially sealed cylinder, including: a second piston and the pressure control chamber, the pressure control chamber both on a first side of the second piston and within the second partially sealed cylinder; and (3) transferring a force from the first piston to the second piston via a rigid coupler affixed at a first end to the first piston and at a second end to the second piston, such as to alternating inflate and deflate a seal.

Referring now to FIG. 1, in one embodiment, a first seal system 100 for sealing a moveable object with a deformable seal is illustrated. The first seal system 100 includes the steps of: inserting an element for sealing 110 next to a deformable/flexible seal element; inflating the deformable/flexible seal 120 to establish contact with the element to be sealed; operating a device using the sealed element 130; deflating the deformable flexible seal 140; and removing the element 150, where the steps of inserting 110, sealing 120, operating 130, deflating 140, and removing 150 are optionally and preferably repeated for a sequential series of inserted objects to be sealed and operated on.

Example I

Herein, for clarity of presentation and without loss of generality, a carbon sequestration unit is used as an example of the inserted element in the first seal system 100. Referring now to FIG. 2, in this example, the element to be inserted, a carbon sequestration cartridge, is inserted into a seal system; is used to remove carbon from the atmosphere; and is removed, where the process is repeated with a series of carbon sequestration cartridges.

Still referring to FIG. 2, generally, a carbon sequestration system 200 includes the steps of: inserting a carbon sequestration cartridge 610 for sealing 210 between a pair of deformable/flexible seal elements; inflating the pair of deformable/flexible seal elements 220 to establish contact with the carbon sequestration cartridge; sequestering carbon 230, such as by passing carbon rich air over a carbon removing element like a zeolite, further described infra; deflating the pair of deformable/flexible seal elements 240; and removing the carbon sequestration cartridge 250, where the steps of inserting 210, inflating 220, sequestering 230, deflating 240, and removing 250 are optionally and preferably repeated for each member of a set of carbon sequestration cartridges, as further described infra.

Still referring to FIG. 2 and referring now to FIGS. 3, 4, 5, 6, 7A, and 7B, generally in the carbon sequestration system 200, a seal, that is manufactured in two halves and/or two or more pieces, is located around the periphery of a pressure or vacuum vessel. A box, such as the carbon sequestration cartridge 610, is inserted into the vessel that has a flat-faced frame around the outside edge that aligns with the seal on each face of the vessel that is to be sealed. When the seal is inflated, it bridges the gap between a half of the vessel, as illustrated for clarity of presentation, and the box or carbon sequestration cartridge 610. When both seals are inflated, then the vessel halves and the box form a complete, low leakage vacuum or pressure vessel. The box optionally and preferable contains a material that will be processed under vacuum conditions, such as a zeolite, diatomaceous earth, a zeolite, and/or other an absorbent material that pulls a hazardous or valuable chemical from the air. When the absorbent material has absorbed a sufficient amount of chemical, the box is inserted into the vessel, and the seals are inflated. This enables a the pressure in the vessel to be raised or lowered to enhance recovery of the chemical.

Referring now to FIG. 3, a single seal system 300 is illustrated. Optionally, the single seal system 300 uses one or more flexible/deformable seals 330 as a seal filling a gap with of a distance, d, between two objects, such as a first side element 310 and a second side element 320 or between the first side element 310 and the object to be sealed. Herein, a flexible/deformable seal comprises a seal that is both flexible and deformable. Generally, each flexible/deformable seal spans a gap distance to an object to which it is sealed, such as a first seal spanning a first distance, $d_1$, between a first set of two elements, a second seal spanning a second distance, $d_2$, between a second set of two elements, a third seal spanning a third distance, $d_3$, between a third set of two elements, . . . , and an $n^{th}$ seal spanning a $n^{th}$ distance, $d_n$, between an $n^{th}$ set of two elements, where n is a positive integer, such as 1, 2, 3, 4, 5, 6, 10, 15, or more. The one or more flexible/deformable seals 330 are optionally alternatingly inflated/deflated with air, one or more gases, and/or one or more fluids, referred to as a filling agent, connected to the one or more flexible/deformable seals through one or more inflation/deflation lines 340, such as tubes and/or a manifold system. As illustrated, the one or more flexible/deformable seals are filled with the filling agent passing through a first filling line 342 and an optional second filling line 344. Optionally and preferably, any filling line, such as the first filling line 342 and/or the secondary filling line 346 at another point in time used as a deflation line, such as by opening a valve and/or reversing a filling pump, as further described infra.

Figure 4:
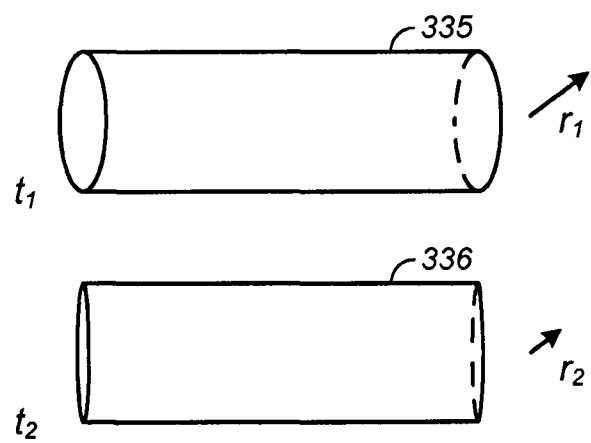
FIG. 4 illustrates a deformable seal in a filled state and a partially deflated state.

Referring now to FIG. 4, an example of the one or more flexible/deformable tubes is illustrated: (1) at a first time, such as at an inflated time, partially inflated time, and/or a sealing time and (2) at a second time, such as at a deflated time, partially deflated time, and/or seal release time. In this example, a tube with a round cross section 335 is illustrated at the first inflated time, where the tube has an oval cross-section 336 at the second partially deflated time. More generally, a flexible/deformable tube comprises any axial cross-sectional shape and/or geometry that spans the gap distance, d, at the first time and the flexible/deformable tube comprises another version of any axial cross-section shape and/or geometry, at the second time, that is smaller than the gap distance, d, such as less than 1000, 100, 50, 25, 10, or 5 mm and/or less than 99, 95, 90, 80, 70, 60, 50, 40, or 30 percent of the gap distance and greater than 0.01, 0.1, 1, 2, 3, 5, or 10 mm and/or great than 1, 2, 5, 10, or 20 percent of the gap distance.

Figure 5:
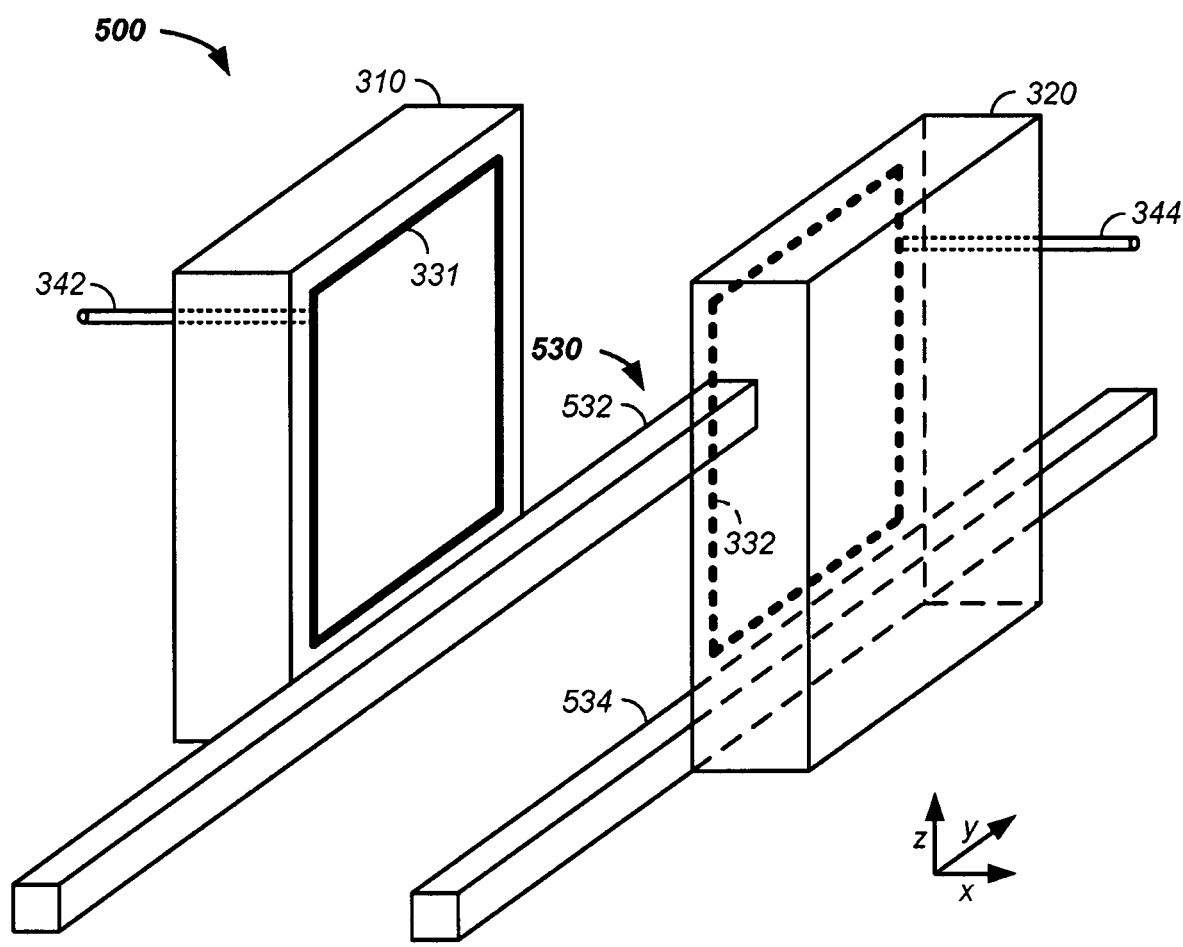
FIG. 5 illustrates a pair of deformable seals about a replaceable/exchangeable object to be sealed.
Figure 6:
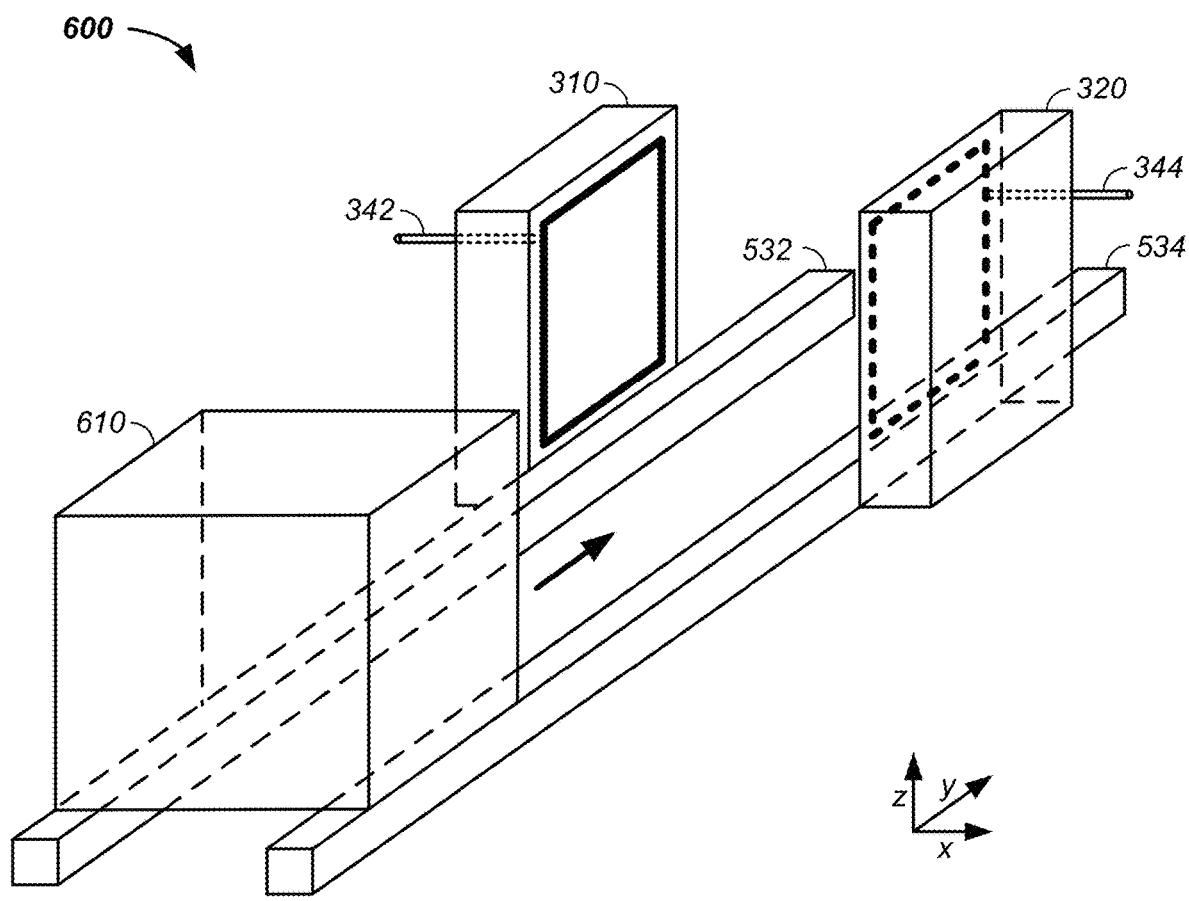
FIG. 6 illustrates a carbon sequestration unit on a rail system sealed by the pair of deformable seals.

Referring now to FIG. 5 and FIG. 6, a dual seal system 500 is illustrated. For clarity of presentation and without loss of generality, the dual seal system 500 is illustrated as forming a left seal on an object and a right seal on an object, where any number of seals on any number of sides and/or surface are optionally used. Again for clarity of presentation and without loss of generality, the sealed object is a carbon sequestration cartridge 610. However, the sealed object is optionally any physical device needing a temporary seal on a least one surface. Similarly, optionally the flexible/deformable seal elements are not attached to the object to be sealed, rather they are attached to surrounding elements, such as the first side element 310 and/or the second side element 320, and make contact with the element to be sealed when the flexible/deformable seal(s) have been filled to fill their respective gap distance to make contact with the object to be sealed. Further, the dual seal system 500, illustrated with two flexible/deformable seals, is optionally a system using any integral number of seals, such as at least 1, 2, 3, 4, 5, 6, 10, 15, or 20 seals on any 1, 2, 3, 4, 5, 6, or more sides of the object to be sealed. Further, more than one seal is optionally used on a single surface of the object, such as two seals on a first surface where an outer seal forms a perimeter seal around an inner seal.

Still referring to FIG. 5, as illustrated the dual seal system 500 includes: (1) a first flexible and deformable seal 331 attached to the first side element 331, which is alternatingly inflated and deflated through passage of the filling agent through the first filling line 342 into/out of the first flexible and deformable seal 331 and (2) a second flexible and deformable seal 332 attached to the second side element 332, which is alternatingly inflated and deflated through passage of the filling agent through the second filling line 344 alternatingly into and out of the second flexible and deformable seal 332. As illustrated, the first side element 331 and the second side element 332 are respectively attached to a first guide rail 532 and a second guide rail 534. Still referring to FIG. 5 and referring again to FIG. 6, in this example the object to be sealed, the carbon sequestration cartridge 610 is moved, optionally and preferably along one or more guides rails 530, such as the first rail 532 and the second rail 534, from a first position entering the seal system to a second position between the first side element 310 and the second side element 320, not illustrated for clarity of presentation. Once positioned at the second position between the first side element 310 and the second side element 320, the filling agent, respectively passing through the first filling line 342 and/or the second filling line 344, such as distributed by a manifold system, passes into the first flexible and deformable seal 331 and the second flexible and deformable seal 332. A pump system moves the filling agent: (1) into the first flexible and deformable seal 331 sealing a first gap distance, $d_1$, between the first side element 331 and the carbon sequestration cartridge 610 by inflation and (2) into the second flexible and deformable seal 332 sealing a second gap distance, $d_2$, between the second side element 332 and the carbon sequestration cartridge 610 by inflation. Subsequently, such as after the carbon sequestration cartridge 610 has been cleaned by reducing pressure in the cartridge, the seals are released by pumping out the filling agent. When each of the set of flexible and deformable seals, such as the first flexible and deformable seal 331 and the second flexible and deformable seal 332 are at least partially deflated by at least partial removal of the filling agent, a gap forms between the sealing system and the object being sealed. In this case the first gap distance and the second gap distance are no longer being spanned by the respective seal, the first flexible and deformable seal 331 and the second flexible and deformable seal 332. After breaking the seal through partial removal of the filling agent, the carbon sequestration cartridge 610 is removed from the operating position/cleaning position, optionally and preferably by sliding the cartridge along the first rail 532 and the second rail 534, from the second position to a removed position, such as along an assembly line to a subsequent assembly line position or back to the first position for reuse. A pump system for insertion and removal of the filling agent is further described, infra.

Coupled Dual Pump System

Figure 7A:
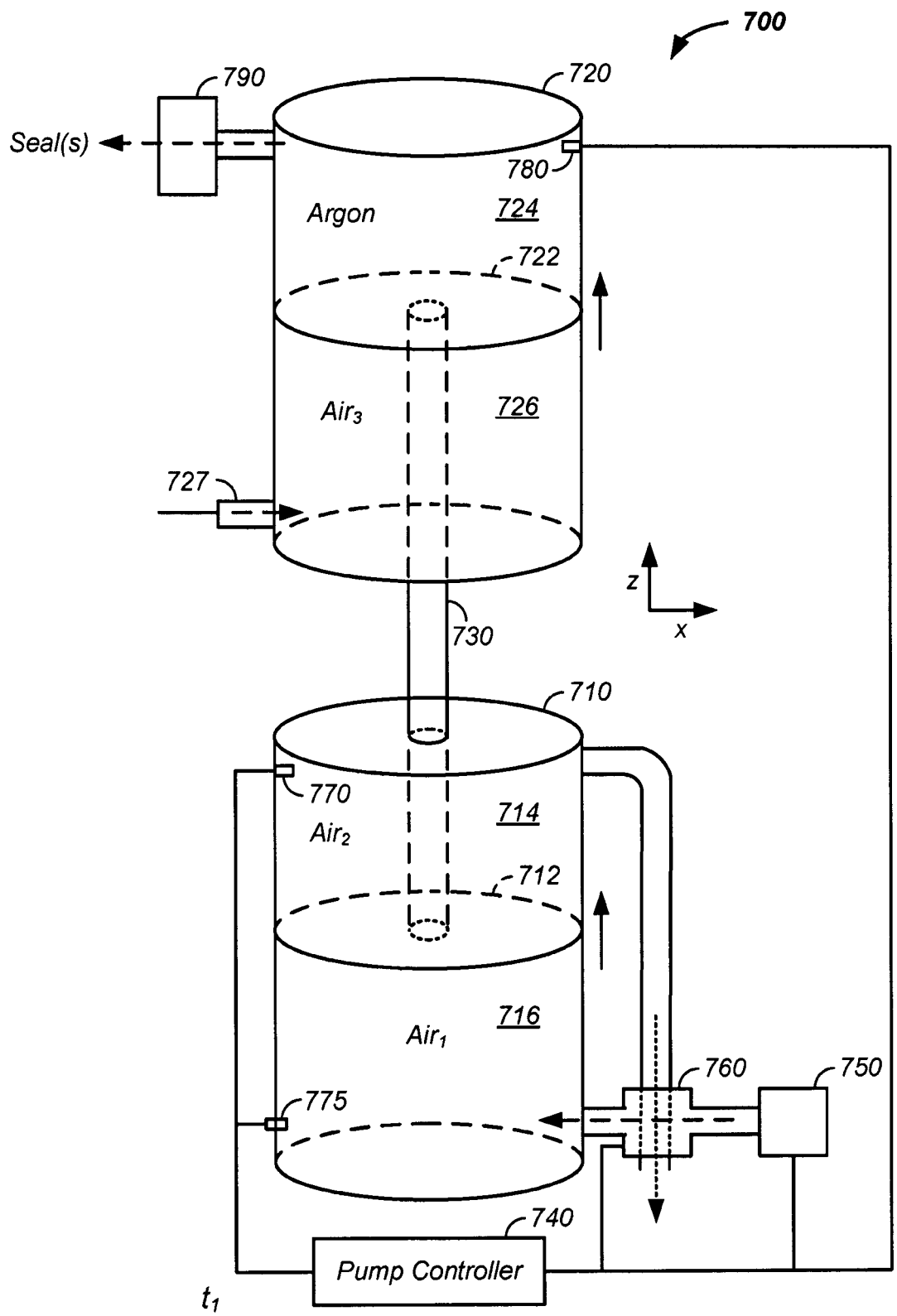
FIG. 7A illustrates a coupled dual pump system in an inflation mode.
Figure 7B:
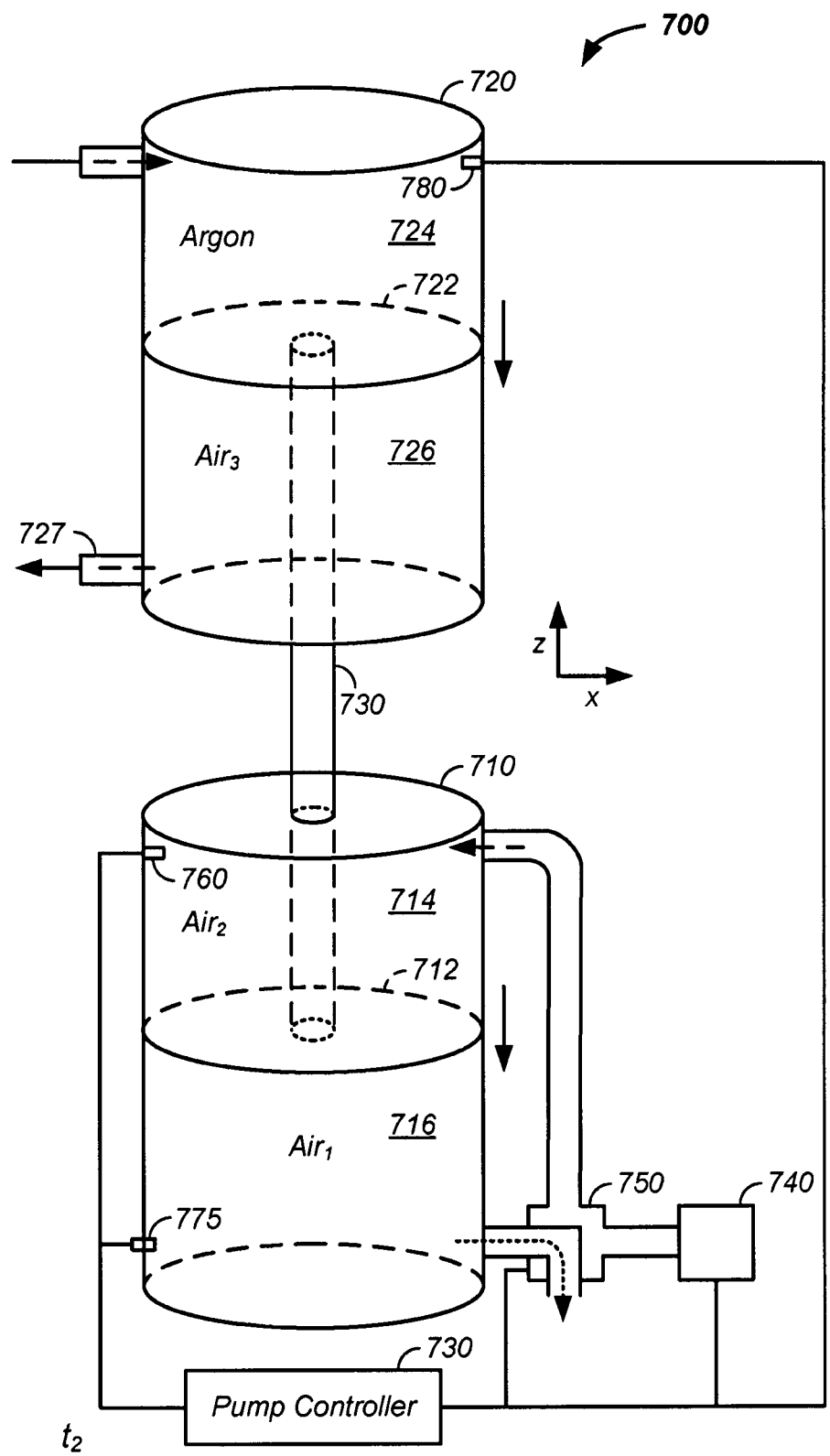
FIG. 7B illustrates the coupled dual pump system in a deflation mode.

Referring now to FIG. 7A and FIG. 7B, an example of a coupled dual pump system 700 is provided. For clarity of presentation and without loss of generality, the coupled dual pump system 700 is illustrated as providing the argon gas, as a filling agent, to the flexible and deformable seals, described supra. More generally, the coupled dual pump system 700 is optionally and preferably used to deliver any filling agent to any expandable seal. Still more generally, the coupled dual pump system 700 is optionally used as a pump to move any fluid, gas, and/or slurry through mechanical action. The coupled dual pump system 700 is an example of a displacement pump using an alternatingly expanding and decreasing cavity. The coupled dual pump system is an example of a double acting kinematic cylinder.

Still referring to FIG. 7A and FIG. 7B, for clarity of presentation and without loss of generality, an example of the coupled dual pump system 700 to move a gas, such as into one or more of the flexible and deformable seals, is described. The dual pump system 700 includes a first semi-sealed cylinder 710 and a second semi-sealed cylinder 720 with pistons therein coupled with a coupler 730. The coupler 730 mechanically couples movement of a first piston 712 within the first semi-sealed cylinder 710 to a second piston 722 within the second semi-sealed cylinder 720. The coupler is optionally a solid rod or tube made of a rigid material, such as a plastic, polymer, and/or a metal, that moves with and links movement of the first piston 712 with the second piston 722. The coupler 730 is optionally housed in a tube between the first semi-sealed cylinder 710 and the second semi-sealed cylinder 720. The coupler 730 and/or a housing of the coupler passes through a first seal, not illustrated for clarity of presentation, to the first semi-sealed cylinder 710 and passes through a second seal, not illustrated for clarity of presentation, to the second semi-sealed cylinder 720.

Still referring to FIG. 7A and FIG. 7B, during use, the movement of the first piston 712 in the first semi-sealed cylinder 710 alternatingly rarefies and compresses gas, such as air, in a first upper chamber 714 and a first lower chamber 716. For instance, at a first time, $t_1$, a pump 750, optionally controlled by a pump controller 740, compresses first air, $air_1$, in the first lower chamber 716, which acts via the first piston 712 to compress second air in the first upper chamber 714. Additionally, via the coupler 730, at the same time, compressing the first air in the first lower chamber 716 additionally compresses argon, an exemplary filling agent, in a second upper chamber 724 of the second semi-sealed cylinder 720, which in turn expands one or more of the flexible and deformable seals, described supra, such as through a manifold distribution system 790 and results in the expanded seal, such as illustrated at the first time, $t_1$, in FIG. 4. Notably, the argon is in a sealed system. At a second time, one or more valves 760 are reconfigured so that the pump 750 pumps air into the first upper chamber 714, which moves the first piston 712 down and at the same time, via the coupler 730, pulls the second piston 722 down resultant in expansion of the second upper chamber containing the argon filling agent. The increased volume of the second upper chamber 724 in the sealed argon chamber pulls argon out of the flexible and deformable seals, which breaks the seal covering the respective gap distance, d, of the seal and results in a seal shape as illustrated at the second time in FIG. 4. During the second time period of breaking the seal by removing the argon from the seal, such as the first flexible and deformable seal 331 and/or the second flexible and deformable seal 332, air in the second lower chamber is optionally and preferably exhausted to the environment, such as through an exhaust port 727, which is optionally and preferably an open tube, vent, and/or muffler to the environment used to reduce energy requirements on the pump 740. Overall, the coupled dual pump system 700 allows the pump 740 to operate on the first semi-sealed cylinder 710 using environmental air and move the filling agent, the argon, in the second semi-sealed cylinder 720 repetitively and cyclically into and out of one or more of the flexible and deformable seals without loss of the expensive argon filling agent to the atmosphere.

Still referring to FIG. 7A and FIG. 7B, optionally and preferably one or more sensors are used to track and/or determine state of the coupled dual pump system 700. For example, a first sensor 770, such as a first pressure transducer and/or a first contact sensor is positioned at a first end of the first semi-sealed cylinder 710 and/or the second semi-sealed cylinder 720 and is linked to the pump controller 740 allowing the pump controller to determine that a piston, such as the first piston 712 and/or the second piston 722 is at the end of a range of movement within its respective cylinder. Similarly, a second sensor 775, such as a second pressure transducer and/or a second contact sensor is optionally positioned at a second/opposite end of the first semi-sealed cylinder 710 and/or the second semi-sealed cylinder 720 and is linked to the pump controller 740 allowing the pump controller to determine that a piston, such as the first piston 712 and/or the second piston 722 is at the end of a range of movement within its respective cylinder. As the pistons are linked and geometries are known, preferably a single pressure transduced is used to determine piston positions in both first semi-sealed cylinder 710 and the second semi-sealed cylinder 720. The pump controller 740 is optionally and preferably used to control the pump 740, such as an on/off state and/or direction of pumping, and/or is optionally and preferably used to control the position of the one or more valves 760, which are used to push/pull air into the first upper chamber 714 and/or the first lower chamber 716.

Still referring to FIG. 7A and FIG. 7B, optionally and preferably the one or more sensors includes a pressure sensor 780, such as in the upper chamber 724 of the second semi-sealed cylinder 720, which is used to monitor the pressure of the filling agent, such as argon, in the sealed system that includes the one or more linked flexible and deformable seals. The pressure sensor 780 is optionally used to monitor repressurizing the system to a controlled level, such as by replenishing with an argon supply tank after slow loss of argon from the sealed system or the seals, manifold distribution system, and second upper chamber 724.

Generally, the pump 740 and/or a compressor controls air movement and pressures in the first semi-sealed container 710, which via the coupler 730, controls position of the second piston 722 in the second semi-sealed container 720, which in turn controls state of inflation, partial inflation, deflation, and/or partial deflation of each linked flexible and deformable seals. By using the pump 740 to deflate a linked seal, the seal is removed from contact with the sealed/movable element, such as the carbon sequestration cartridge 610, which allows insertion and removal of the carbon sequestration cartridge 610 without damage to the one or more seals spanning the one or more gaps used to seal the one or more sides of the carbon sequestration cartridge 610 and/or the one or more surfaces of the object to be sealed. Herein, partial deflation is optionally less than 99, 95, 90, 80, 70, 60, 50, 40, 30, 20, 10, or 5 percent of a full inflation pressure.

While argon is used as an exemplary filling agent in the examples above, the filling agent is optionally and preferably any gas, fluid, and/or slurry, such as where properties of the filling agent are appropriate to the sealing requirements of the system. For instance a liquid is optionally used when greater sealing forces are required. The argon gas is optionally any air, gas, or combination of gases and/or is a noble gas such as helium, neon, xenon, and/or radon.

Still yet another embodiment includes any combination and/or permutation of any of the elements described herein.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. An apparatus, comprising:
 a sealed compartment, comprising:
  a first flexible and deformable seal;
  a pressure control chamber; and
  a connection tube attached: (1) at a first end to said first flexible and deformable seal and (2) at a second end to said pressure control chamber; and
 a double acting kinematic cylinder, comprising:
  a first partially sealed cylinder, comprising:
   a first piston separating a first chamber and a second chamber within said first partially sealed cylinder;
  a second partially sealed cylinder, comprising:
   a second piston; and
   said pressure control chamber, said pressure control chamber both: (1) on a first side of said second piston and (2) within said second partially sealed cylinder; and
 a rigid coupler affixed: (1) at a first end to said first piston and (2) at a second end to said second piston.

2. The apparatus of claim 1, further comprising:
 a pump connected to at least one of said first chamber and said second chamber.

3. The apparatus of claim 2, further comprising:
 a valve, said valve configured to alternatingly in time connect said pump to said first chamber and said second chamber.

4. The apparatus of claim 2, further comprising:
 a pressure transducer configured to mechanically sense an end of travel of at least one of: (1) said first piston in said first partially sealed cylinder and (2) said second piston in said second partially sealed cylinder; and
 a pump controller linked to said pump and said pressure transducer, said pump controller configured to stop said pump based upon a signal from said pressure transducer.

5. The apparatus of claim 4, further comprising:
 a pressure sensor configured to sense a gas pressure in said pressure control chamber, said pressure sensor connected to said pump controller.

6. The apparatus of claim 1, said second partially sealed cylinder further comprising:
 a venting chamber, said second piston separating said pressure control chamber and said venting chamber within said second partially sealed cylinder;
 an opening in said venting chamber to atmosphere.

7. The apparatus of claim 1, said sealed compartment housing at least one of: helium, neon, argon, krypton, and radon.

8. The apparatus of claim 1, further comprising:
 a second flexible and deformable seal connected to said connection tube.

9. The apparatus of claim 8, further comprising:
 a carbon sequestration cartridge comprising a first face and a second face, said first face contacting said first flexible and deformable seal, said second face contacting said second flexible and deformable seal.

10. The apparatus of claim 9, said carbon sequestration cartridge comprising at least one of: a zeolite and diatomaceous earth.

* * * * *